United States Patent [19]

Wakeman

[11] 4,187,675
[45] Feb. 12, 1980

[54] COMPACT AIR-TO-AIR HEAT EXCHANGER FOR JET ENGINE APPLICATION

[75] Inventor: Thomas G. Wakeman, West Chester, Ohio

[73] Assignee: The United States of America as represented by the Secretary of the Air Force, Washington, D.C.

[21] Appl. No.: 842,139

[22] Filed: Oct. 14, 1977

[51] Int. Cl.² .............................................. F02C 7/18
[52] U.S. Cl. .................................. 60/39.75; 60/266; 165/163
[58] Field of Search ................. 60/39.67, 262, 226 R, 60/266; 165/163, 175

[56] References Cited

U.S. PATENT DOCUMENTS

| | | | |
|---|---|---|---|
| 1,853,322 | 4/1932 | Rose | 165/163 |
| 1,892,778 | 1/1933 | Black | 165/175 |
| 2,487,842 | 11/1949 | Whiteman et al. | 60/226 |
| 3,224,194 | 12/1965 | De Feo et al. | 60/39.67 |
| 3,435,890 | 4/1969 | Junkermann | 165/175 |
| 3,528,250 | 9/1970 | Johnson | 60/266 |
| 3,797,561 | 3/1974 | Clark et al. | 60/226 R |
| 3,842,597 | 10/1974 | Ehrich | 60/226 R |
| 3,893,297 | 7/1975 | Tatem et al. | 60/266 |

FOREIGN PATENT DOCUMENTS

| | | | |
|---|---|---|---|
| 686770 | 12/1939 | Fed. Rep. of Germany | 165/163 |
| 1216705 | 5/1966 | Fed. Rep. of Germany | 60/226 R |

*Primary Examiner*—Douglas Hart
*Attorney, Agent, or Firm*—Joseph E. Rusz; Arsen Tashjian

[57] ABSTRACT

A structurally compact air-to-air heat exchanger, for a gas turbine engine of the fan bypass type, that permits a lower percentage of cooling air, than is presently needed in the art, to cool effectively the hot turbine, and its parts, of the engine. This goal is achieved, in part, by using a portion of the cool flow of fan air as a heat sink, without disturbing the flow of the fan air stream. The heat exchanger is disposed internal of the engine, and, it includes a plurality of flow tubes through which flows the hot cooling air, with the flow tubes positioned in a crossflow relationship with and to a portion of the cool flow of fan air. Three (3) variations of the preferred embodiment of the heat exchanger also are taught.

5 Claims, 9 Drawing Figures

COMPACT AIR-TO-AIR HEAT EXCHANGER FOR JET ENGINE APPLICATION

STATEMENT OF GOVERNMENT INTEREST

The invention described herein may be manufactured and used by or for the Government for governmental purposes without the payment of any royalty thereon.

CROSS REFERENCE TO RELATED APPLICATION

The compact air-to-air heat exchanger taught herein is an alternative solution to the solution taught by me in my copending patent application entitled, "A Compact Fuel-to-Air Heat Exchanger for Jet Engine Application", Ser. No. 797,669 with regard to the same two presently-existing problems in the art. It is to be noted that my compact fuel-to-air heat exchanger can be used with any gas turbine engine, whereas my air-to-air heat exchanger, taught herein, is intended for use with, and is adapted for use with, a gas turbine engine of the fan bypass type.

BACKGROUND OF THE INVENTION

This invention relates to the heat exchanger art and, more particularly, to a compact air-to-air heat exchanger, adapted for use with and in a gas turbine engine of the fan bypass type having a hot flow of cooling air, a cool flow of fan air, and a primary fan air stream duct in which a first portion of the cool flow of fan air flows.

It is well known in the art that, as the gas turbine engine combustor exit temperatures are increased toward stoichiometric, a larger percentage of engine air is required to cool the hot turbine and its parts. It is equally well known in the art that, as higher Mach numbers are attained, and as larger compressor ratios are achieved, with gas turbine engines, the temperature of the compressor discharge air (hereinafter referred to herein, as it is in the art, as the "cooling air" of the engine) is driven to well above 1000 degrees Fahrenheit. Since this cooling air is used to cool the high pressure turbine and its parts, the high temperature of the cooling air also tends to increase the percentage of engine air that is required to cool the turbine and its parts. Therefore, there exists in the art the problem of reducing the total percentage of cooling air that is required to cool the turbine, and the parts thereof, of the gas turbine engine.

Additionally, if a fuel-to-air heat exchanger is used in a gas turbine engine, fire prevention is another inherent problem, because if fuel leaks into the cooling air (which is at high pressure and at high temperature), a fire is almost assured.

I have eliminated, or at least have minimized, these two problems (i.e., the need for an increased total percentage of cooling air to cool the turbine and its parts; and, the need to prevent a fire) by devising a structurally compact and novel air-to-air heat exchanger which I dispose uniquely internal of the gas turbine engine, with my heat exchanger not only being literally and absolutely "fire safe", but also permitting, by its use in the engine, a lesser total percentage of cooling air (than is presently needed) to cool the hot turbine and its parts.

I have, therefore, significantly advanced the state-of-the-art.

SUMMARY OF THE INVENTION

My invention pertains to a structurally novel and compact air-to-air heat exchanger, adapted for use in and with a gas turbine engine of the fan bypass type having a hot flow of cooling air, a primary fan air stream duct, a secondary fan air stream duct, a tertiary fan air stream duct, and a cool flow of fan air which includes a first portion that flows in the primary duct, a second portion that flows in the secondary duct, and a third portion that flows in the tertiary duct. My heat exchanger (which, incidentally, includes the above-mentioned secondary and tertiary fan air stream ducts) is disposed uniquely internal of the fan bypass gas turbine engine, with a principal component thereof (i.e., a plurality of flow tubes through which flows a portion of the hot cooling air) position within and across the secondary fan air stream duct which directs and guides the above-mentioned second portion of cool fan air, whereby heat is transferred from the hot flow of cooling air to the cool flow of fan air, thereby resulting in an exhaust flow of cooled cooling air (i.e., the second portion of cool fan air that flows through the secondary fan air stream duct is used by me, and acts, as a heat sink). In addition, fire safety is eliminated as a concern, simply because an air-to-air, rather than a fuel-to-air, heat exchanger is used.

Accordingly, the principal object of this invention is to teach the novel structure, and the unique positioning within the fan bypass type gas turbine engine, of a preferred embodiment of my air-to-air heat exchanger.

This principal object, as well as other related objects, of this invention will become readily apparent after a consideration of the invention, coupled with reference to the Figures of the drawing.

DESCRIPTION OF THE PREFERRED EMBODIMENT AND VARIATIONS

Figure 1:
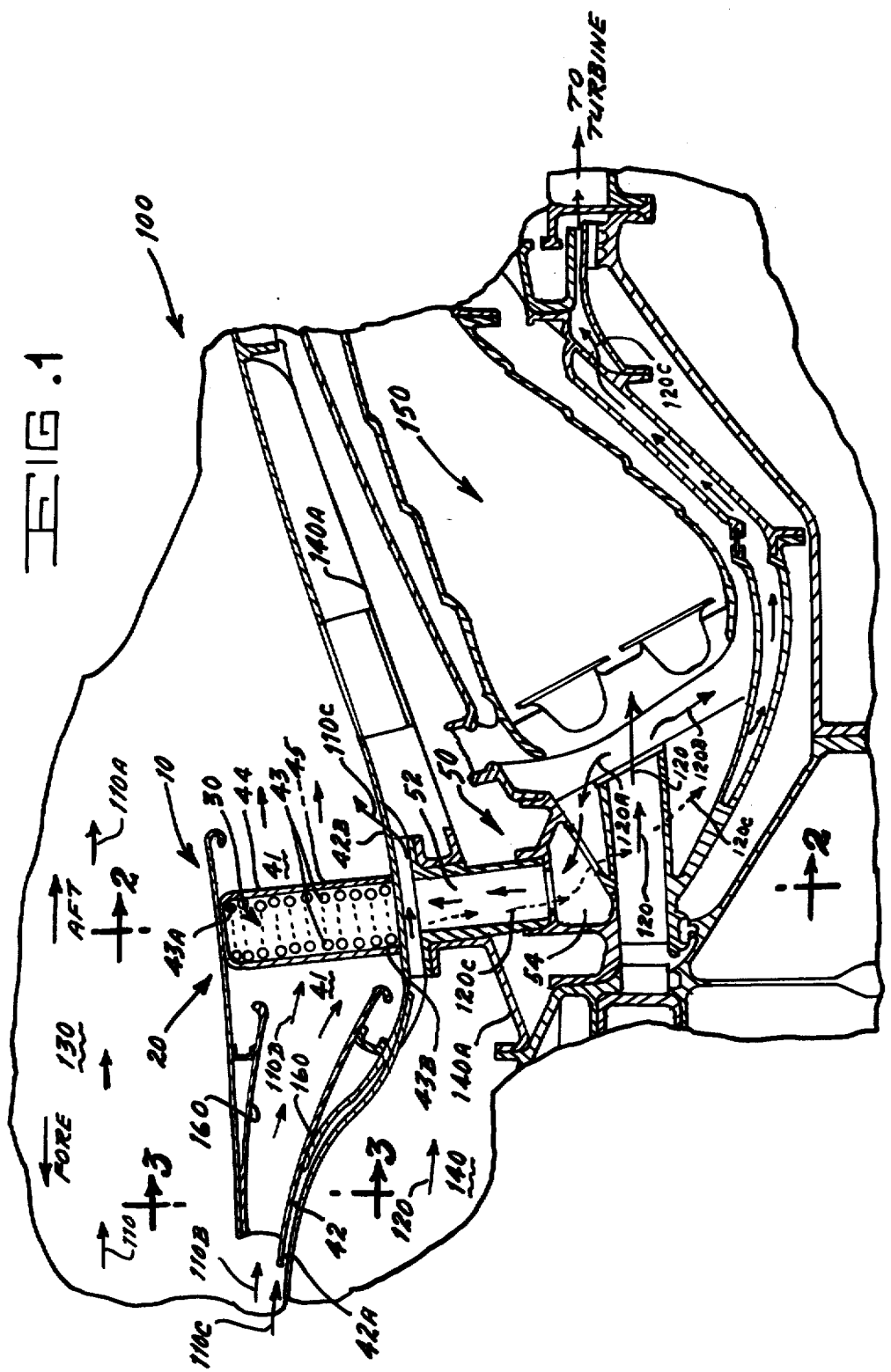
FIG. 1 is a side elevation view, in simplified cross sectional form, partially schematic, partially pictorial, and partially fragmented of a fan bypass type gas turbine engine and of a preferred embodiment of my inventive heat exchanger positioned in its environment within the engine.

With reference to FIG. 1, therein is shown, in simplified form, a preferred embodiment, generally designated 10, of my inventive air-to-air heat exchanger, positioned uniquely in its environment within a fan bypass type gas turbine engine 100, hereinafter referred to as a "turbofan".

It is to be noted that my invention 10 is intended, and adapted, for use with a turbofan, such as 100, preferably, but not necessarily, in combination with means 50 for manifolding, and directing the flow of, the hot flow of cooling air and the resultant exhaust flow of cooled cooling air, with said manifolding and flow-directing means 50 being of the type described, shown and claimed in my copending patent application Ser. No. 797,669 entitled, "A Compact Fuel-to-Air Heat Exchanger for Jet Engine Application", and herein incorporated by reference.

In this regard, it is also to be noted that the turbofan 100 has a cool flow of fan air 110, with constituent portions of that flow being designated as a first portion 110A, as a second portion 110B, and as a third portion 110C, and with these constituent portions also being designated by directional arrows; that the turbofan 100 also has a fan air stream duct 130, hereinafter referred to as the "primary" fan air stream duct; and, that the turbofan 100 further has a hot flow of cooling air 120, a fire safe cavity 140, a baffle 54 (i.e., a component of the manifolding and flow-directing means discussed hereinbefore), a combuster section 150 in communication with the fire safe cavity 140, and a diffuser 160 that is disposed across a duct 41 which will be described later herein.

In its most basic and generic form, the preferred embodiment 10 of my inventive air-to-air heat exchanger is structurally compact (i.e., concentrated), so that it fits, and is positioned, within the representative turbofan 100, and comprises: means, generally designated 20, for cooling the hot flow of cooling air, such as 120; and, means, generally designated 30, for heating a portion 110B (hereinafter referred to as "the second portion") of the cool flow of fan air 110, with this heating means 30 in association with the cooling air cooling means 20.

Still with reference to FIG. 1, the means for cooling 20 and the means for heating 30 include, in common: a secondary fan air stream duct 41, adjacent to the primary air stream duct 130, through which flows the second portion 110B of the cool flow of fan air 110; and, a plurality of flow tubes 43, such as representative ones 43A and 43B, that are arcuate in (geometric) form, as indicated by the individual circular cross sections and the dashes therebetween, FIG. 1, and through which flows a portion 120A of the hot cooling air 120, with the flow tubes 43 disposed within, and in transverse relationship to, the secondary fan air stream duct 41, and also simultaneously disposed in cross flow relationship with and to the second portion 110B of the cool flow of fan air 110, and with the flow tubes 43 having a plurality of circumferentially spaced, radially extending headers 44 which are supported from and connected to a common cooling air inlet manifold disposed radially inwardly therefrom and a plurality of circumferentially spaced, radially extending headers 45 which are supported from and connected to a common cooling air outlet manifold disposed radially inwardly therefrom (i.e., common "headers").

The plurality of tubes 43 is supported within the secondary fan air stream duct 41 by the common inlet manifold and the common outlet manifold.

Again with reference to FIG. 1, the heat exchanger 10 further comprises a tertiary fan air stream duct 42 through which flows another portion, a third portion 110C, of the cool flow of fan air 110, with this tertiary duct 42 having an inlet 42A and an outlet 42B that are in communication with the primary fan air stream duct 130, and with the tertiary duct 42 adjacent to the secondary fan air stream duct 41, and also with this tertiary duct 42 located rearward (i.e., aft) of the plurality of flow tubes 43 and in communication with the secondary fan air stream duct 41.

Figure 2:
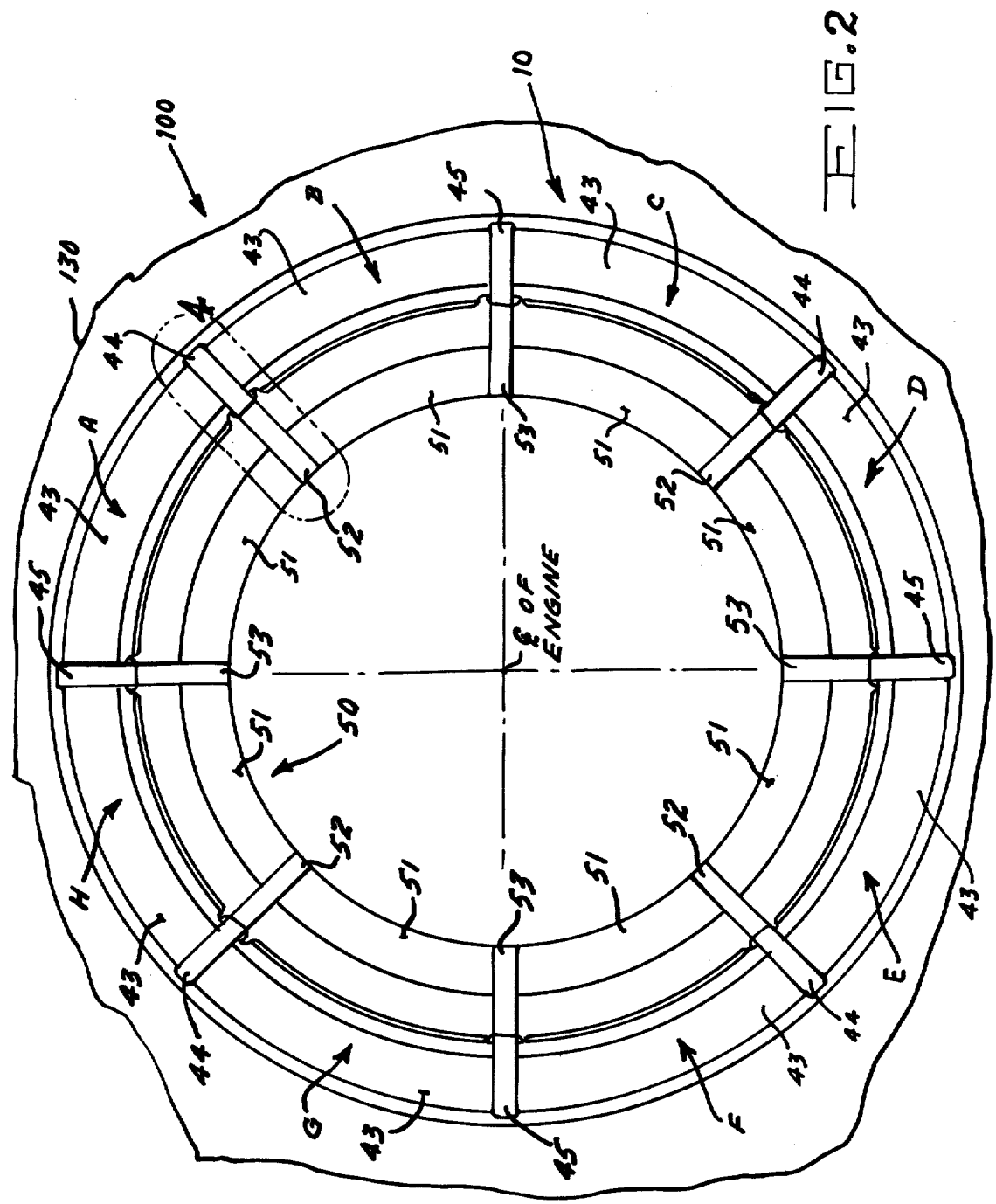
FIG. 2 is a view taken along line 2—2 in FIG. 1.

Now, with reference to FIG. 2, therein is shown, in schematic form, what is viewed along line 2—2 in FIG. 1. In essence, shown therein is a simplified cross sectional view of the turbofan 100 and of my invention 10, and some components thereof, in their respective positional relationship. More specifically shown are: the center line of the turbofan 100; the plurality of flow tubes 43; the inlet headers 44 for each plurality of flow tubes 43; the outlet headers 45 for each plurality of flow tubes 43; the manifolding-flow directing means 50 of the hot flow of cooling air and the resultant exhaust flow of cooled cooling air; a manifold 51 of the manifold-flow directing means 50; the entry pipes (or tubes) 52 of the means 50; the return pipes (or tubes) 53.

It is to be noted that it is preferred, as shown in this FIG. 2, that the heat exchanger 10 be in the form of a plurality of identical, interconnected, arcuate, and individually replaceable modules, such as the eight (8) modules labelled A, B, C, D, E, F, G and H, of 45 degrees each. Of course, the heat exchanger 10 can be configuration in an endless annular form of 360 degrees.

Figure 3:
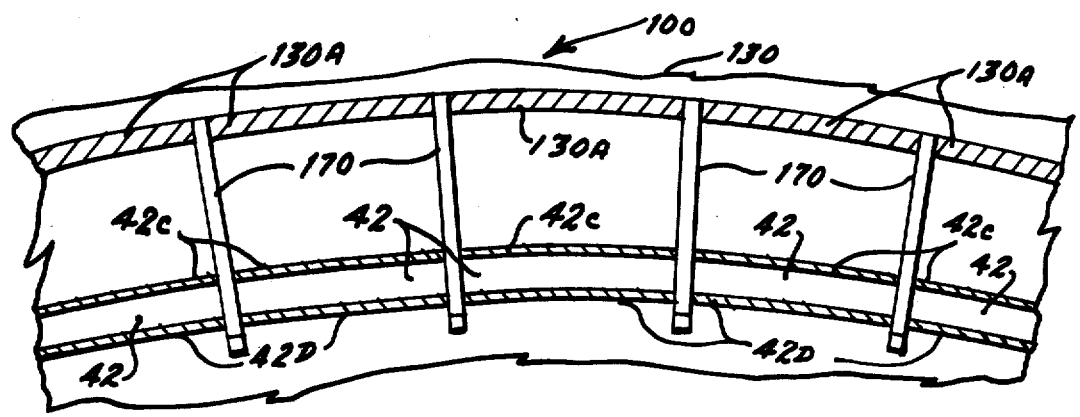
FIG. 3 is a view taken along line 3—3 in FIG. 1.

With reference to FIG. 3, therein is shown, in simplified schematic form and partially fragmented, what is viewed along line 3—3 of FIG. 1. What is shown in FIG. 3, from the radially outward location in the turbofan 100 to a radially inward location, includes: the primary (or main) fan air stream duct 130, in which fan air stream 110 flows, with inner surface 130A; a plurality of struts 170, radially disposed transversely to duct 130; tertiary cool fan air stream duct 42, in which the third portion 110C of the fan air stream flows, with outer surface 42C and inner surface 42D; and, fire safe cavity 140.

Figure 4:
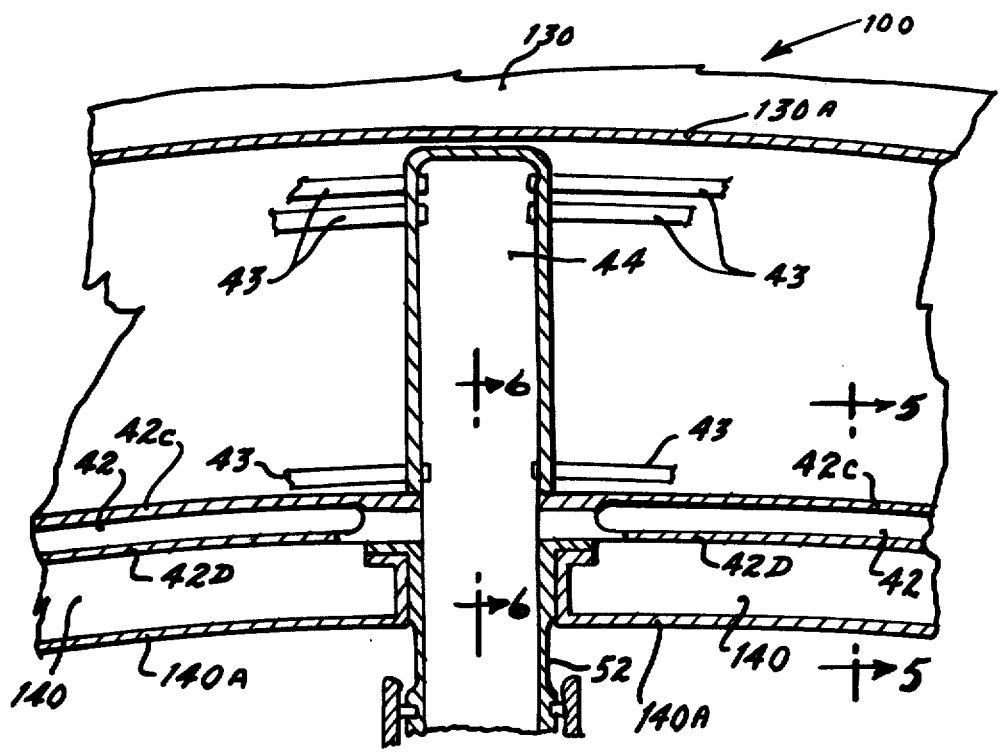
FIG. 4 is a view taken along the closed curve 4 in FIG. 2.

Now, with reference to FIG. 4, shown therein, in simplified schematic form, partially fragmented, and enlarged and in detail, is what is enclosed in closed curved line 4 in FIG. 2. Shown, from the radially outward location in the turbofan 100 to a radially inward location, are: primary fan air stream duct 130 with inner surface 130A; representative ones of the pluralities of flow tubes 43; transversely positioned representative inlet header 44 which is common to the pluralities of flow tubes 43 which in turn are in communication with the header 44; tertiary cool fan air strem duct 42, with outer surface 42C and inner surface 42D; fire safe cavity 140; casing 140A; and, transversely positioned representative entry pipe (or tube) 52 in communication with the representative inlet header 44.

Figure 5:
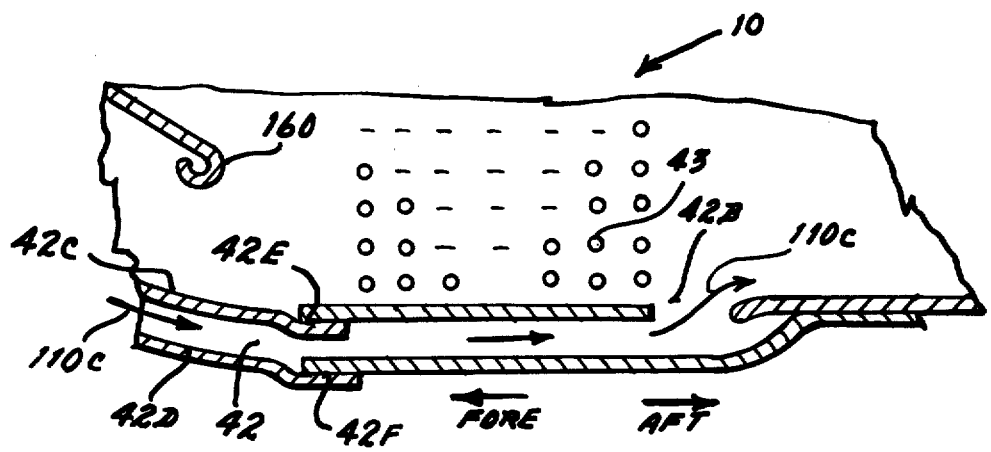
FIG. 5 is a view taken along the line 5—5 in FIG. 4.

With reference to FIG. 5, therein is shown, in simplified schematic form, partially fragmented, and enlarged and in detail, what is viewed along line 5—5 of FIG. 4. In this Figure can be seen: the diffuser 160 (see also FIG. 1); the plurality of flow tubes 43; and, very importantly, the tertiary fan air stream duct 42, with its outer surface 42C, inner surface 42D, and outlet 42B located aft of the plurality of flow tubes 43. Also shown are: slip joints 42E and 42F which are supplied for assembly purposes; and, the fore-to-aft directional flow of the third portion 110C of the cool fan air 110 within and out of duct 42. In this regard, and with reference to FIG. 1, it is to be noted that the diffuser 160 is immediately downstream of the inlet 42A of the tertiary fan air stream duct 42.

Figure 6:
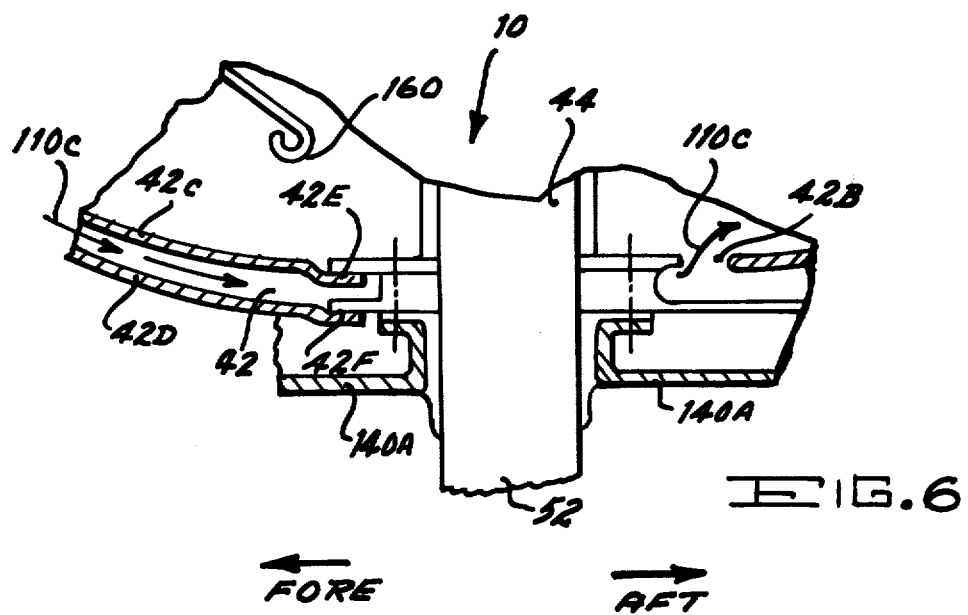
FIG. 6 is a view taken along the line 6—6 in FIG. 4.

Now, with reference to FIG. 6, therein is shown, in simplified schematic form, partially fragmented, and enlarged and in detail, what is viewed along line 6—6 of FIG. 4. In this Figure can be seen the diffuser 160; an inlet header 44; an entry pipe 52; the flow of cool fan air 110C in and through tertiary duct 42 with its outer surface 42C, inner surface 42D, thermal slippage joints 42E and 42F, and outlet 42B. It is here to be noted that the heat exchanger is, by preference, bolted (as shown schematically) to bosses on casing 140A, thereby trapping inner surface 42D (which is a casing of duct 42.

With reference to FIGS. 7, 8, 9 and 10, therein are shown, in simplified schematic form and partially fragmented, variations of my air-to-air heat exchanger 10, FIGS. 1-6, inclusive.

Figure 7:
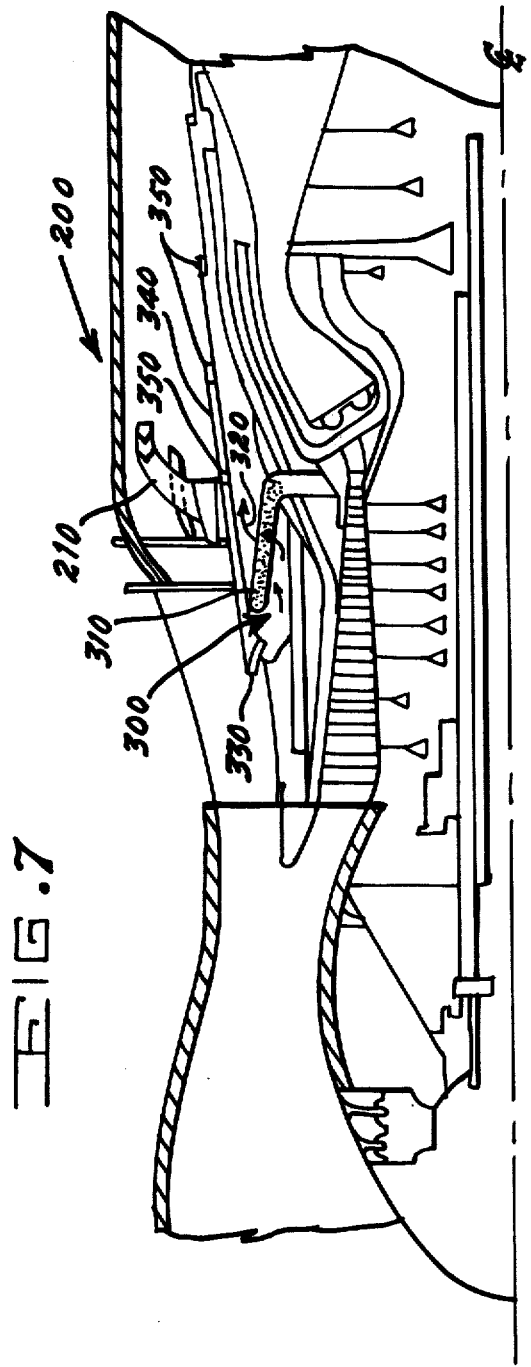
FIGS. 7, 8, and 9 are side elevation views of four other fan bypass type gas turbine engines, in simplified cross sectional form, partially pictorial, and partially schematic, showing a different structural variation and/or different positioning of my air-to-air heat exchanger, internal of each engine.

In FIG. 7 is shown a duct burning turbofan 200, with duct flameholder 210. In this variation 300 of my compact air-to-air heat exchanger, the plurality of flow tubes 310 is slanted (i.e., inclined); and, air 320 from the heat exchanger 320 is used for film cooling. The heat exchanger includes a scoop assembly 330, a duct 340, and a plurality of slots 350.

Figure 9:
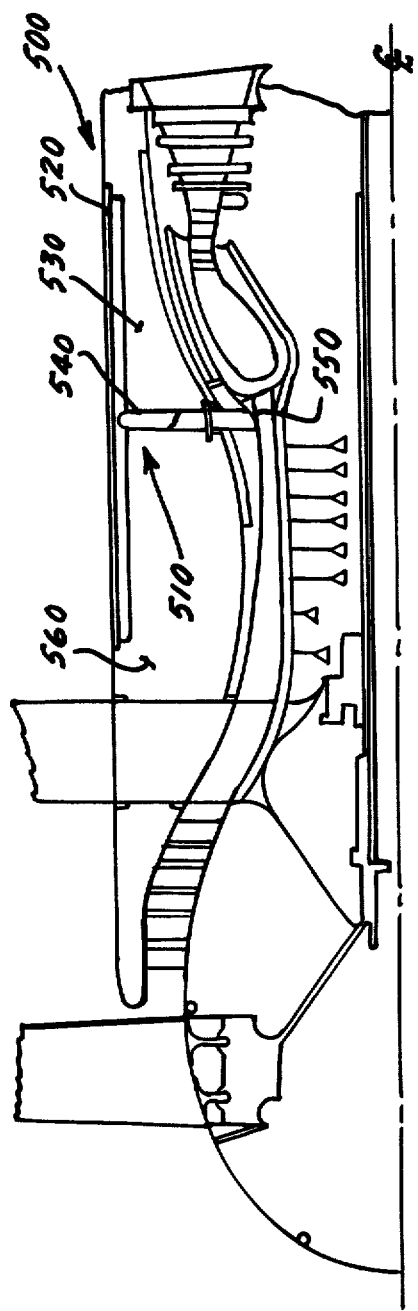

In FIG. 9 is shown still another turbofan 500 with heat exchanger 50 where the plurality of flow tubes 520 take the place of the outer (or upper) surface of the fan air stream duct 530. Also shown are intake pipes 540, manifold 550, and fire safe cavity 560.

Figure 8:
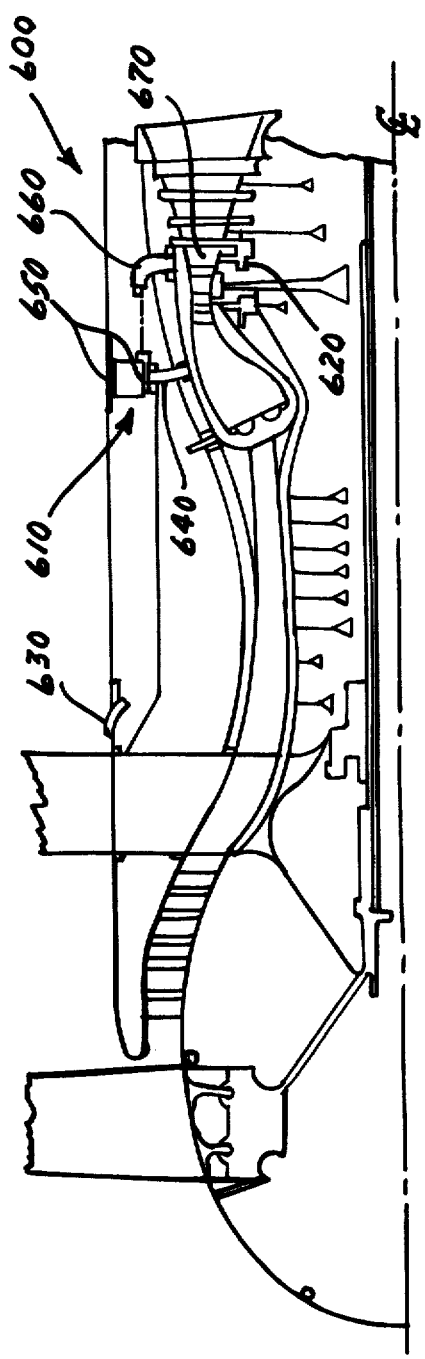

In FIG. 8 is shown yet another turbofan 600 with heat exchanger 610 which is located such as to require minimum air piping for supplying cooled cooling air to the turbine through an aft inducer 620. Also shown therein are: fan air scoop 630; combuster liner air intake piping 640; flow tubes 650; exhaust piping 660; and hollow vanes 670.

MANNER OF OPERATION OF THE PREFERRED EMBODIMENTS AND VARIATIONS

The manner of operation of the preferred embodiment 10 (FIGS. 1-6, inclusive), and of the variations 300 (FIG. 7), 510 (FIG. 9), and 610 (FIG. 8) can be ascertained by a person of ordinary skill in the art from the foregoing description, together with reference to the Figures of the drawing.

For others, the following simplified explanations are considered sufficient.

With regard to the preferred embodiment 10, FIGS. 1-6, inclusive, a portion of the hot flow of cooling air 120A enters the compact heat exchanger 10, and the resultant exhaust flow of cooled cooling air 120C leaves the compact heat exchanger 10, by use of a manifold, and air flow-directing means 50, with a baffle 54 separating the incoming and the outgoing (i.e., exhaust) air. The cooling air 120 is transferred to and from the heat exchanger headers 44 and 45 from the manifold 51 by entry pipes 52 and return pipes 53 which have thermal accommodating slip joints 42E and 42F. The cooling air 120A enters inlet headers 44; passes through flow tubes 43; and, is collected by outlet headers 45.

On the other hand, a portion of the cool fan air 110B is supplied to the compact heat exchanger 10 through a diffuser 160 which supplies a static pressure rise to drive cool fan air 110B over, under, around, and across the flow tubes 43 through which is flowing the hot cooling air 120A. To insure that the diffuser 160 operates without stalling (although stalling is unlikely), the duct boundary layer (i.e., the third portion 110C) of the cool fan air is removed by the use of and through the passage 42 (i.e., the tertiary fan air stream duct); is ducted past the flow tubes 43; and, is reintroduced aft of the flow tubes 43 at outlet 42B. As a related matter, it is to be noted that diffuser 160 is made structurally sound by the use of radial struts, such as 170. As a result of the foregoing actions, the exhaust flow of cooled cooling air flows into, and cools, the turbine (as labelled in FIG. 1).

With regard to the variation 300, FIG. 7, of my compact air-to-air heat exchanger 10, FIGS. 1-6, inclusive, a plurality of local scoops of the scoop assembly 330 allow the boundary layer of cool fan air to pass around these local scoops; to run down the duct 340; and, to discharge through the first of the plurality of slots 350. Air which diffuses through the scoops 330 passes over, under, around, and across the flow tubes 310 of the heat exchanger 300, and then discharges as a film through the remaining slots 350 to cool the duct wall. Slanting of the flow tubes 310 in the available space provides a greater flow area for the fan air, and exposes a larger area of the flow tubes 310 to the fan air flow, while nevertheless using a relatively small member of flow tubes 310.

With regard to the variation 500, FIG. 9, of my compact air-to-air heat exchanger 10, FIGS. 1-6, inclusive, air is supplied over, under, around, and across the flow tubes 520 by intake pipes 540 and manifold 550. The flow tubes 520 and the pipes 540 are, preferably, insulated.

With regard to the variation 610, FIG. 8, of my compact air-to-air heat exchange 10, FIGS. 1-6, inclusive, air reaches the inducer 620 by flowing through the hollow vanes 670. Fan air is diffused by the scoop 630. Combustor liner air is drawn by intake piping 640; passes over, under, around, and across flow tubes 650; and, is supplied to the turbine by and through exhaust piping 660, hollow vanes 670, and inducer 670.

CONCLUSION

It is abundantly clear from all of the foregoing, and from the contents of the Figures of the drawings, that the stated principal object, as well as other related objects, of my invention have been attained.

It is to be noted that, although there have been described the fundamental and unique features of my inventive compact air-to-air heat exchanger, as applied to a particular preferred embodiment and variations thereof, various other embodiments, adaptations, substitutions, additions, omissions, and the like may occur to, and can be made by, those of ordinary skill in the art, without departing from the spirit of my inventive compact air-to-air heat exchanger.

What is claimed is:

1. A compact air-to-air heat exchanger, adapted for use in a gas turbine engine of the fan bypass type having a hot flow of cooling air, a cool flow of fan air, and a primary fan air stream duct in which a first portion of said cool flow of fan air flows, comprising:
    a. means for cooling said hot flow of cooling air;
    b. and, means for heating a second portion of said cool flow of fan air, with this said means in association with said cooling air cooling means;
    wherein said compact air-to-air heat exchanger is disposed internal of said bypass type gas turbine engine, whereby heat is transferred from said hot flow of cooling air to said second portion of said cool flow of fan air, thereby resulting in an exhaust flow of cooled cooling air; and
    wherein said means for cooling and said means for heating include, in common, a secondary fan air stream duct, adjacent to said primary air stream duct, through which flows said second portion of said cool flow of fan air, and, a plurality of flow tubes through which flows said hot cooling air, with said flow tubes disposed within and in transverse relationship to said secondary fan air stream duct, and are also simultaneously disposed in cross flow relationship with and to said second portion of said cool flow of fan air, and with said flow tubes having a plurality of circumferentially spaced, radially extending headers which are supported from and are connected to a common cooling air inlet manifold disposed radially inward therefrom and a plurality of circumferentially spaced, radially extending headers which are supported from and are connected to a common cooling air outlet manifold disposed radially inward therefrom.

2. A compact air-to-air heat exchanger, as set forth in claim 1, wherein said plurality of flow tubes are arcuate in form, and are supported within said secondary fan air stream duct by said plurality of headers and their common cooling air inlet manifold to which said headers are connected and said plurality of headers and their said common air outlet manifold to which said headers are connected.

3. A compact air-to-air heat exchanger, as set forth in claim 2, wherein said heat exchanger further comprises a tertiary fan air stream duct, through which flows a third portion of said cool flow of fan air, with said tertiary fan air stream duct having an inlet and an outlet that are in communication with said primary fan air stream duct, and with said tertiary fan air stream duct adjacent to said secondary fan air stream duct and also with said outlet of said tertiary fan air stream duct located rearward of said plurality of flow tubes and in communication with said secondary fan air stream duct.

4. A compact air-to-air heat exchanger, as set forth in claim 3, wherein said heat exchanger also further comprises a diffuser disposed across said secondary fan air stream duct and immediately downstream of said inlet of said tertiary fan air stream duct.

5. A compact air-to-air heat exchanger, as set forth in claim 4, wherein said heat exchanger is configured in an endless annular form of 360 degrees.

* * * * *